L. MAZZUCA.
COOKING VESSEL COVER.
APPLICATION FILED DEC. 5, 1917.
1,288,644.
Patented Dec. 24, 1918.
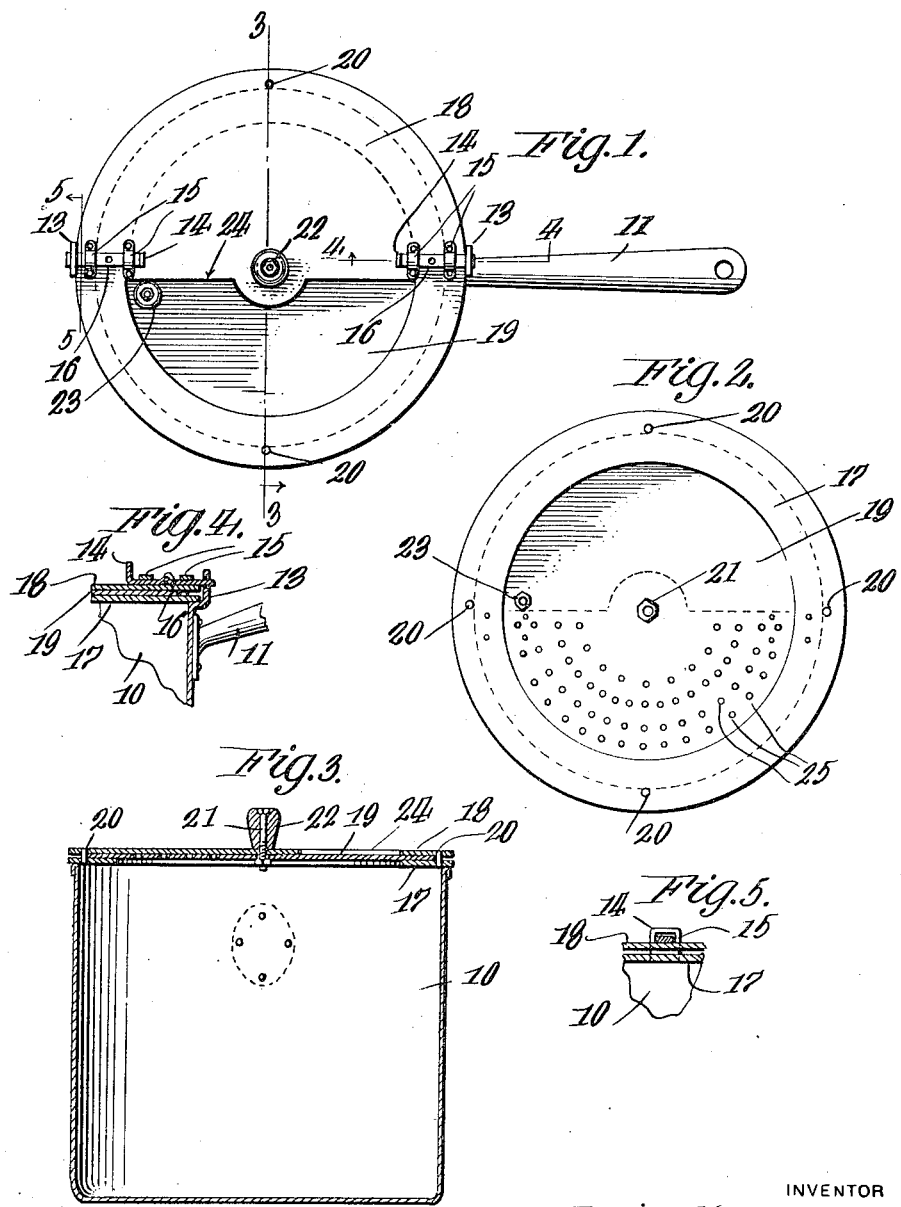
INVENTOR
Louis Mazzuca
WITNESSES
BY
ATTORNEY

UNITED STATES PATENT OFFICE.

LOUIS MAZZUCA, OF TRENTON, NEW JERSEY.

COOKING-VESSEL COVER.

1,288,644.  Specification of Letters Patent. Patented Dec. 24, 1918.

Application filed December 5, 1917. Serial No. 205,552.

*To all whom it may concern:*

Be it known that I, LOUIS MAZZUCA, a citizen of the United States, residing at Trenton, in the county of Mercer and State of New Jersey, have invented certain new and useful Improvements in Cooking - Vessel Covers, of which the following is a specification.

This invention relates to an improved cooking vessel cover and the principal object of the invention is to provide a cover which may be placed upon a cooking vessel and releasably locked thereon and to further so construct this cover that liquid may be poured out of the vessel without the solid contents of the vessel passing out with the liquid.

Another object of the invention is to so construct this cover that a closure plate for an opening formed in the cover may be easily and quickly moved either to a closed or an open position.

Another object of the invention is to provide a cover which will be strong in construction and which will be so constructed that the adjustable plate will be held against warping.

Another object of the invention is to so construct this cover that it may be formed almost entirely of sheet metal and thus produced at a minimum cost.

This invention is illustrated in the accompanying drawings, wherein:—

Figure 1 is a top plan view showing the cover in place upon a cooking vessel,

Fig. 2 is a plan view of the cover looking at the inner face thereof,

Fig. 3 is a transverse sectional view taken along the line 3—3 of Fig. 1.

Fig. 4 is a sectional view taken along the line 4—4 of Fig. 1, and,

Fig. 5 is a sectional view taken along the line 5—5 of Fig. 1.

This cover is used in connection with a cooking vessel 10 which in the form shown is a saucepan provided with a handle 11. This cooking vessel illustrates a conventional form of vessel and it is to be understood that the invention is not limited to the specific construction of the vessel. At the upper edge of the vessel there is provided ears 13 constituting sockets engaged by the latches 14 slidably connected with the cover by the guides or straps 15 and limited in their outward sliding movement by the abutment points 16 and also by the upturned inner end portions of the latches which upturned inner end portions of the latches provide actuating heads. This cover is provided with the inner and outer plates or sections 17 and 18 and an intermediate section or plate 19 positioned between the inner and outer plates and held against outward movement by the rivets or other fasteners 20 which connect the inner and outer plates. This inner plate is rotatably mounted upon the securing bolt 21 of the handle 22 and carries a knob or button 23 extending through the opening 24 of the upper section or plate 18 thus permitting the inner plate or section to be rotated and at the same time limiting the rotation of this section. One portion of the section will be provided with openings 25 so that when this perforated portion is moved to register with the cut out 24, liquid may be poured out of the vessel 10 but solid matter retained in the vessel. Therefore if boiling potatoes, the water could be drained from the potatoes when cooked without the potatoes passing out of the vessel and further without it being necessary to hold the cover in place with one hand while tilting the vessel to drain the water. This will therefore prevent danger of burning by steam. If desired, the inner section or plate could be mounted upon the bolt 21 and this plate could then be provided with groups of openings of different sizes, thus permitting a selected group of openings to be brought into registry with the cutout 24 formed in the outer plate of the cover according to the type of material being cooked. Of course, in this connection, the opening 24 would be smaller than that shown in Fig. 1 and the knob or button 23 would be eliminated.

What is claimed is:—

1. A cover comprising an inner section cut out to provide a fluid passage, an outer section cut out to provide a fluid passage, an intermediate section positioned between the inner and outer sections and provided with a plurality of openings, fasteners connecting the inner and outer sections and engaging the intermediate section to hold the intermediate section in place, between the inner and outer sections and permit rotation of the intermediate section to bring the openings thereof into registry with the cutout of the outer section, and means for rotating the intermediate section.

2. A cover comprising an outer section provided with a cutout, an intermediate section provided with openings for registry with the cutout of the outer section, a ring connected with the outer section and forming an inner section engaging the intermediate section upon which the intermediate section is rotatably mounted, a handle for the cover fitting upon the outer section and provided with a fastener passing through the outer and intermediate sections, and means for rotating the intermediate section.

3. A cover comprising an outer section provided with a cutout, an intermediate section fitting against the inner face of the outer section and provided with openings for registering with the cutout of the outer section, a ring forming an inner section engaging the intermediate section, means connecting the inner section with the outer section and engaging the edge portions of the intermediate section, and a handle fitting against the outer section and provided with a fastener passing through the outer and intermediate sections.

4. A cover comprising an outer section provided with a cut out portion, an inner section comprising a ring shaped member, and an intermediate section rotatable between said outer and inner sections, said intermediate section comprising a disk provided with a perforated portion adapted at times to be rotated into registration with the cut out in said outer section and with imperforated portion adapted at times to be rotated to a position beneath said cut out, means for rotating said intermediate section, and a plurality of fastening members connecting said outer and inner sections and engaging the peripheral edge of said intermediate section to confine the same therebetween.

In testimony whereof I affix my signature in presence of two witnesses.

LOUIS MAZZUCA.

Witnesses:
R. E. SMITH,
E. H. HATCH.

Copies of this patent may be obtained for five cents each, by addressing the "Commissioner of Patents. Washington, D. C."